(No Model.) 2 Sheets—Sheet 1.
N. A. CHRISTENSEN.
VALVE FOR AIR BRAKES.
No. 580,846. Patented Apr. 20, 1897.
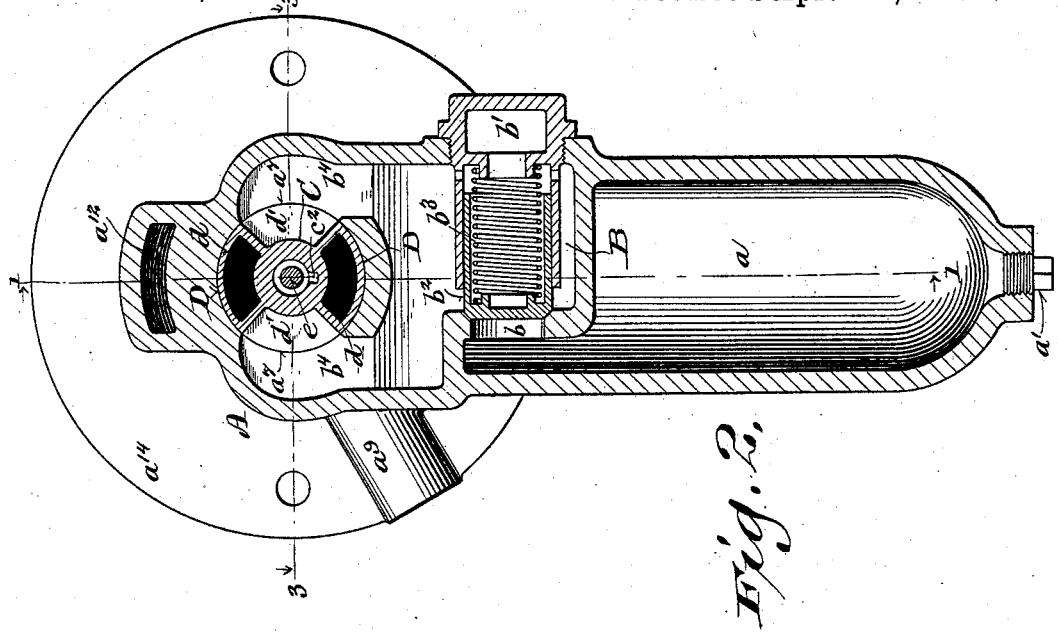
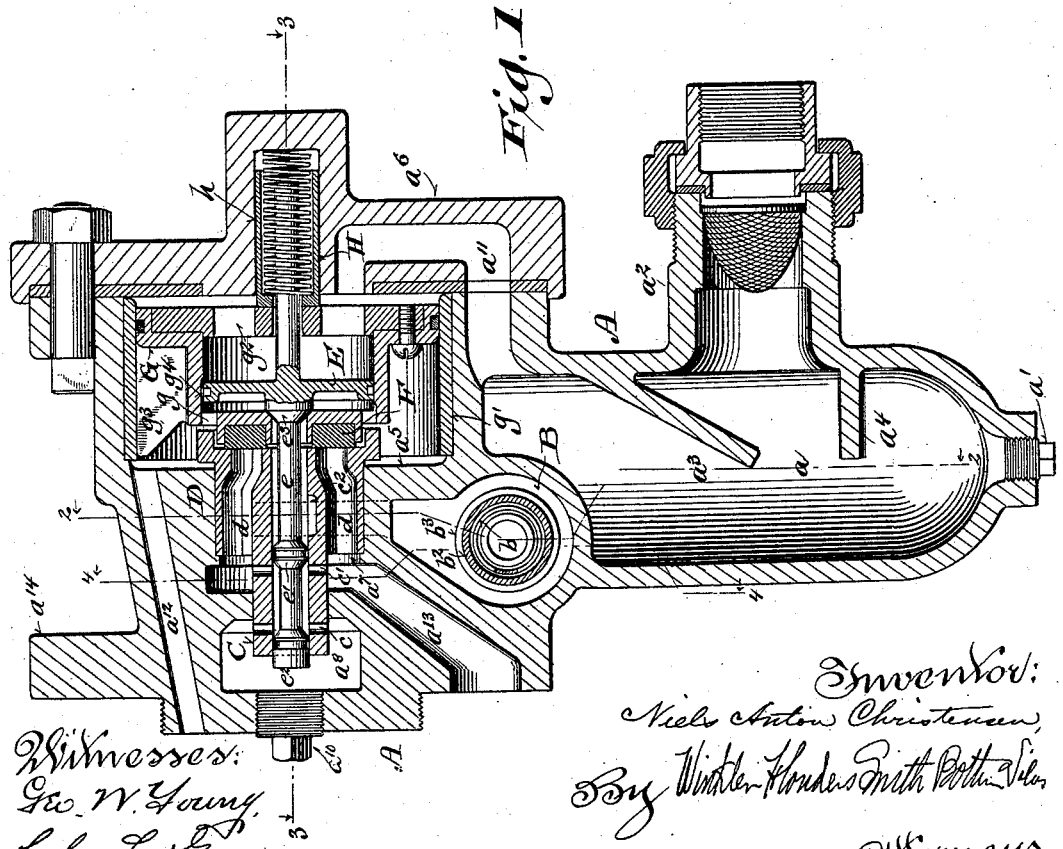

(No Model.) 2 Sheets—Sheet 2.

N. A. CHRISTENSEN.
VALVE FOR AIR BRAKES.

No. 580,846. Patented Apr. 20, 1897.

UNITED STATES PATENT OFFICE.

NIELS ANTON CHRISTENSEN, OF MILWAUKEE, WISCONSIN, ASSIGNOR OF ONE-HALF TO SAMUEL W. WATKINS, OF SAME PLACE.

VALVE FOR AIR-BRAKES.

SPECIFICATION forming part of Letters Patent No. 580,846, dated April 20, 1897.

Application filed April 30, 1896. Serial No. 589,657. (No model.)

*To all whom it may concern:*

Be it known that I, NIELS ANTON CHRISTENSEN, of Milwaukee, in the county of Milwaukee and State of Wisconsin, have invented certain new and useful Improvements in Valves for Air-Brakes; and I do hereby declare that the following is a full, clear, and exact description of the invention, which will enable others skilled in the art to which it pertains to make and use the same, reference being had to the accompanying drawings, and to the letters of reference marked thereon, which form a part of this specification.

My invention relates to "triple" valves, so called, employed in connection with automatic air-brakes. Its main objects are to simplify the construction and improve the operation of devices of this class; and it consists in certain novel features in the construction and arrangement of the component parts of valve mechanism, as hereinafter particularly described, and pointed out in the claims.

In the accompanying drawings like letters designate the same parts in the several figures.

Figure 3:
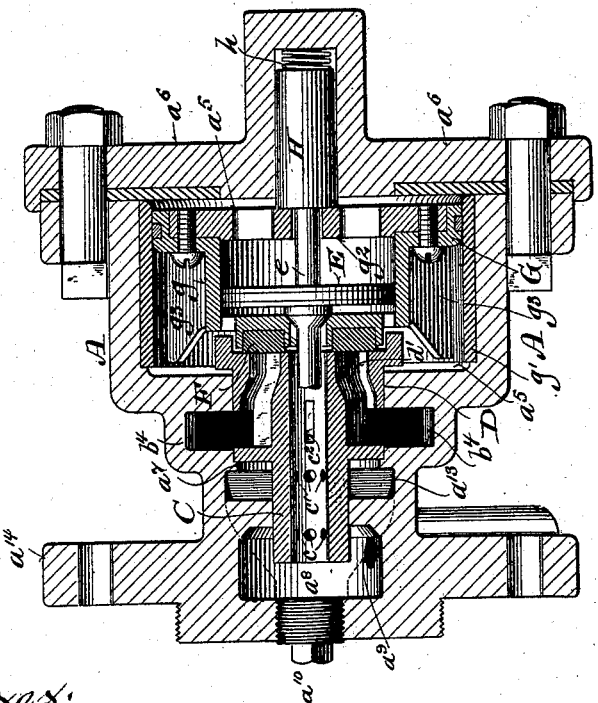

Figure 1 is a vertical axial section of my improved valve on the line 1 1, Fig. 2. Fig. 2 is a vertical cross-section of the valve on the line 2 2, Fig. 1. Fig. 3 is a horizontal cross-section on the line 3 3, Fig. 1; and Fig. 4, a vertical cross-section on the line 4 4, Fig. 1.

Figure 4:
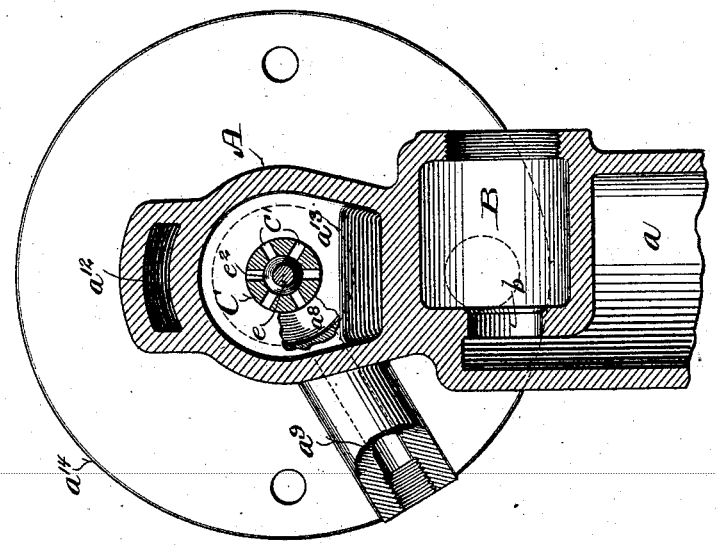

A designates the valve-case. It is formed with a depending drip-chamber $a$, terminating at its lower end in a waste-opening which is normally closed by a screw plug or cap $a'$. The drip-chamber is formed on one side with a neck $a^2$, provided with a coupling of any usual or suitable form for connection with the train-pipe. It is also formed inside, above and below the train-pipe connection, with inwardly-projecting plates $a^3$ and $a^4$, the upper plate serving to deflect into the bottom of the chamber any dust, cinders, or particles of dirt that may enter through the train-pipe, and the lower plate serving to prevent the air-current entering through the train-pipe from disturbing the dust or dirt in the bottom of said chamber. The valve-case is also formed in one end of the upper portion with a cylindrical chamber $a^5$, which may be designated the "auxiliary-valve" chamber. This chamber is closed at one end by a cap $a^6$, bolted to the valve-case with an interposed gasket to prevent leakage. At the opposite end of this chamber a cylindrical extension or opening $a^7$ is formed concentrically therewith, and in the opposite end of the case from the cap $a^6$ is formed a chamber $a^8$, which opens to the atmosphere through a lateral passage $a^9$, as shown in Fig. 4. A screw-threaded opening is made through the end of the valve-case into the chamber $a^8$, and this opening is closed by a plug $a^{10}$. A central cylindrical opening of smaller diameter is made between the extension $a^7$ and chamber $a^8$.

A passage $a^{11}$ in the cap $a^6$ connects the drip-chamber $a$, and through it the train-pipe, with the outer end of the valve-chamber $a^5$, a passage $a^{12}$, leading out of the opposite end of said valve-chamber, connects it with the auxiliary reservoir, and a passage $a^{13}$, leading from the end of the extension or opening $a^7$ next to the chamber $a^8$, connects it with the brake-cylinder.

In the upper part of the drip-chamber $a$ is formed a check-valve chamber B, which has a port $b$ at its inner end opening into said drip-chamber and a screw-threaded opening in its outer end through the valve-case. Into this opening is screwed a barrel $b'$, in which is loosely fitted a check-valve $b^2$, normally held by a spring $b^3$ against its seat in the port $b$. The chamber B opens on the upper side into a passage $b^4$, which in turn communicates with opposite sides of the opening $a^7$, as shown in Figs. 2 and 3.

The end of the valve-case in which the passages $a^{12}$ and $a^{13}$ open is formed, as shown in Figs. 1 and 3, with a circular flange $a^{14}$ for securing the valve to the head of the brake-cylinder. I have shown the train-pipe, auxiliary-reservoir, and brake-cylinder connections arranged according to the standard Westinghouse air-brake system, so that my improved valve may be substituted for the triple valves of that system without other change in the apparatus.

C designates the main-valve chamber. It is preferably made in tubular or cylindrical form, as shown, and open at both ends. It may be conveniently cast integrally with a cylindrical bushing D, which is fitted in the opening $a^7$ of the valve-case and is formed with passages $d\,d$ and $d'\,d'$, which all open at one end into the valve-chamber $a^5$, the passages $d$ opening at the opposite end into an annular enlargement of the passage $a^{13}$ and the passages $d'$ being closed at their opposite ends and opening through the sides into the passage $b^4$.

The main-valve chamber C is closely fitted in and projects through the partition between the chamber $a^8$ and passage $a^{13}$. It is formed with two rows of radiating holes or lateral ports $c\,c'$, opening, respectively, into the chamber $a^8$ in communication with the atmosphere and into the annular enlargement of the passage $a^{13}$ in communication with the brake-cylinder.

The main valve consists of the stem $e$, formed or provided with two heads $e'$ and $e^2$, fitted within the cylindrical chamber C, and normally including between them, as shown in Fig. 1, the ports $c$ and $c'$, and with a third head $e^3$, controlling communication between the main-valve chamber C and the auxiliary-valve chamber $a^5$, as hereinafter explained.

F designates the auxiliary valve. It is made of annular form and is constructed and arranged to normally close the several ports of the passages $d\,d'$ opening into chamber $a^5$. Through the port or opening in its center passes the stem $e$ of the main valve, and the head $e^3$ normally closes said port or opening, thereby controlling communication between the auxiliary-valve chamber $a^5$ and the main-valve chamber. The auxiliary valve is attached to the head of a cylindrical extension $g$ of a piston G, which is fitted in a bushing $g'$ of chamber $a^5$. The opposite end of this piston and its cylindrical extension are provided with a perforated head or plate $g^2$, through which air entering the chamber $a^5$ from passage $a^{11}$ enters the cylinder $g$. Within the cylinder $g$ is fitted the piston E on the main-valve stem, which is extended outwardly therefrom through the head $g^2$ of the auxiliary piston into a socket formed in the cap $a^6$ of the valve-case.

The piston G is formed with wings $g^3\,g^3$, by which it is guided and held in its proper position in the bushing $g'$. A tubular plunger H, fitted in the socket in cap $a^6$ and pressed inwardly by a spring $h$ against the piston-head $g^2$, holds the auxiliary valve F normally to its seat.

Openings are formed in the head of the cylinder $g$, to which the auxiliary valve F is attached, and a space is left between said cylinder and the adjacent end of bushing D, so that there is free communication between that end of cylinder $g$ and chamber $a^5$. The main-valve chamber C is formed in one side, between the auxiliary valve F and the ports $c'$, with a longitudinal passage $c^2$, by means of which the supply of air from the auxiliary reservoir to the brake-cylinder is graduated in making a service stop, as hereinafter explained.

I have not shown in connection with my improved valve other parts of air-brake apparatus, such as the auxiliary reservoir, brake-cylinder, and train-pipe, as their arrangement and operation are so familiar, and the illustration thereof is not deemed essential to a clear understanding of my invention.

My improved valve operates as follows: For making a service stop, pressure in the train-pipe being reduced, as usual, say about five pounds, the piston E is moved to the right by the higher pressure to which it is exposed on the opposite side from the auxiliary reservoir through the passage $a^{12}$. This movement withdraws the head $e^3$ of the main valve from its seat in the central opening or port of the auxiliary valve and carries the head $e^2$ between the ports $c$ and $c'$, thereby cutting off communication between the brake-cylinder and the atmosphere through passage $a^{13}$, valve-chamber C, chamber $a^8$, and passage $a^9$. A further movement of the main valve in this direction carries its head $e'$ over the passage $c^2$, thus allowing compressed air from the auxiliary reservoir to pass from the chamber $a^5$ between piston E and auxiliary valve F into the valve-chamber C, through passage $c^2$ therein, around the head $e'$, thence through port $c'$ and passage $a^{13}$ into the brake-cylinder. As the pressure in the auxiliary reservoir approaches the reduced pressure in the train-pipe the piston E will gradually move back to the left, carrying the head $e'$ of the main valve past the end of passage $c^2$, thereby cutting off communication between the auxiliary reservoir and the brake-cylinder. A movement of the main valve to the left sufficient only to carry the head $e'$ to the end of passage $c^2$ does not carry the head $e^2$ far enough to open the port $c$. Consequently if the piston and main valve remain in this position the compressed air previously admitted to the brake-cylinder will be retained therein and the application of the brakes will be maintained as long as this condition continues. To release the brakes, the pressure in the train-pipe is restored, thereby moving piston E and the main valve to its original position, closing the port in the auxiliary valve F, and bringing the ports $c\,c'$ into communication with each other, thereby allowing the compressed air to escape from the brake-cylinder. By gradually lowering the pressure in the train-pipe a gradually-increasing opening of the passage $c^2$ by the valve-head $e'$ will be produced and a graduated admission of air from the auxiliary reservoir to the brake-cylinder will be effected. Thus a gradual application of the brakes is made, and any degree of pressure up to the maximum pressure may be applied thereto and maintained, when applied, for any desired length of time by the proper manipulation of the engineer's controlling-valve. When normal pressure is restored in the train-pipe and the piston E is carried to the extreme limit of its movement to the left against the reduced auxiliary-reservoir pressure, the pressure in said reservoir will be restored to normal by the passage of compressed air from the end of cylinder G, in communication with the train-pipe, through a restricted passage $g^4$ into the opposite end of said cylinder, thence through passage $a^{12}$ into said reservoir. The passage $g^4$, which is shown in Fig. 1, is closed by a slight movement of the piston E to the right.

For making an emergency stop a greater reduction of train-pipe pressure, say about twelve pounds, is made in the usual way, whereupon the auxiliary-reservoir pressure will instantly shift both pistons E and G to the right, thereby not only shifting the main valve so as to close communication between the exhaust-port and the passage $a^{13}$, leading to the brake-cylinder, and establishing communication between said passage and the auxiliary-valve chamber $a^5$ through the main-valve chamber C, but also unseating the auxiliary valve F and opening the ports of the passages $d$ $d'$. When this takes place, the air passing from the chamber $a^5$ through the passages $d$ $d$, as well as through the main-valve chamber C into the passage $a^{13}$, quickly reduces the pressure in the auxiliary-valve chamber $a^5$ below the reduced train-pipe pressure, whereupon the check-valve $b^2$ will open, allowing air from the train-pipe to pass through port $b$, passages $b^4$ and $d'$, into the auxiliary-valve chamber, thence through the passages $d$ and passage $a^{13}$ into the brake-cylinder. This further reduces the train-pipe pressure and causes a like action of the triple valves on succeeding cars to take place simultaneously or in very close succession. The opening between the cylinder $g$ and the adjacent end of the bushing D is of smaller area than the ports of the passages $d$ $d'$, so that upon the opening of the auxiliary valve F for making an emergency application of the brakes the passage of air under higher pressure from the auxiliary reservoir will be restricted and retarded, so as to allow train-pipe air under lower pressure to enter the brake-cylinder in the manner stated. As soon as the pressure in the brake-cylinder and train-pipe are approximately equalized the check-valve $b^2$ is closed by the spring $b^3$, after which air under higher pressure from the auxiliary reservoir will continue to flow into and increase the pressure in the brake-cylinder until the pressure in said cylinder and reservoir are equalized and the most powerful application of the brakes possible is made, which is effected almost instantly or in a very short interval of time.

It will be observed that the passage $b^4$ in the valve-case A and the passages $d$ $d'$ between the main-valve chamber C and bushing D constitute by-passages around or outside of the main-valve chamber from the train-pipe and auxiliary reservoir to the brake-cylinder.

The restricted passage for the air from the auxiliary reservoir to the brake-cylinder for emergency application of the brakes may be made by forming lateral openings in the rim or flange of bushing D around or adjacent to the auxiliary-valve seat therein, said flange or rim in this case being fitted closely to the outer rim of the auxiliary-valve head. The passage in or through the main-valve chamber for effecting a service or graduated application of the brakes may also be variously modified. In place of a single passage, as $c^2$, a number of similar passages of the required area may be provided in the main-valve chamber and so arranged as to permit the passage of a gradually-increasing volume of air as the main valve is moved to the right.

In short, various modifications in the minor details of the device may be made within the spirit and intended scope of my invention.

I claim—

1. In a triple valve for air-brakes the combination of a valve-case having train-pipe, auxiliary-reservoir and brake-cylinder connections, a main valve controlling communication between the auxiliary reservoir and brake-cylinder and between said cylinder and the exhaust, a main piston for operating said valve, exposed on one side to auxiliary-reservoir pressure and on the other to train-pipe pressure, an auxiliary valve controlling communication between the train-pipe and brake-cylinder, and also between the auxiliary reservoir and brake-cylinder independently of the main valve and an auxiliary piston arranged to operate said auxiliary valve also exposed on one side to auxiliary-reservoir pressure and on the other to train-pipe pressure, substantially as and for the purposes set forth.

2. In a triple valve for air-brakes the combination of a valve-case having train-pipe, auxiliary-reservoir and brake-cylinder connections, and a waste or exhaust opening, a main valve controlling communication between the auxiliary-reservoir and brake-cylinder connections and between the brake-cylinder connection and exhaust-opening, an auxiliary valve controlling communication between the train-pipe and brake-cylinder, the main valve being movable independently of the auxiliary valve and main and auxiliary pistons one arranged to work within and independently of the other and connected respectively with the main and auxiliary valves, said pistons being exposed on one side to train-pipe pressure and on the other to auxiliary-reservoir pressure, substantially as and for the purposes set forth.

3. In a triple valve for air-brakes the combination of a valve-case having train-pipe, auxiliary-reservoir and brake-cylinder connections, a main-valve chamber, a main valve controlling communication through said chamber between the brake-cylinder and auxiliary reservoir and between said brake-cylinder and the atmosphere, a by-pass around said valve-chamber for establishing direct communication between the brake-cylinder, train-pipe and auxiliary reservoir independently of the main valve, an auxiliary valve controlling said by-pass, and pistons connected with said valves and both exposed on one side to train-pipe pressure and on the other to auxiliary-reservoir pressure, substantially as and for the purposes set forth.

4. In a triple valve for air-brakes the combination of a valve-case having train-pipe, auxiliary-reservoir and brake-cylinder connections, an auxiliary-valve chamber having ports in communication with the train-pipe and auxiliary reservoir, a main-valve chamber open at one end into said auxiliary-valve chamber and having ports communicating with the brake-cylinder and atmosphere, by-passages outside of the main-valve chamber having ports opening into the auxiliary-valve chamber and communicating respectively with the train-pipe and brake-cylinder, an auxiliary valve normally closing the ports of said by-passages and having an opening registering with the open end of the main-valve chamber, a main valve having heads normally closing the opening in the auxiliary valve and controlling communication between the ports of the main-valve chamber, and pistons arranged in the auxiliary-valve chamber between the auxiliary-reservoir and train-pipe ports and connected respectively with said valves, substantially as and for the purposes set forth.

5. In a triple valve for air-brakes the combination of a valve-case having train-pipe, auxiliary-reservoir and brake-cylinder connections, an auxiliary-valve chamber having ports communicating with the train-pipe and auxiliary reservoir, a main-valve chamber opening at one end into said auxiliary-valve chamber and having ports communicating with the brake-cylinder and with the atmosphere, by-passages outside of the main-valve chamber and having ports opening into the auxiliary-valve chamber and communicating respectively with the train-pipe and brake-cylinder, an auxiliary valve normally closing the ports of said by-passages and having a port or opening registering with the opening in the end of the main-valve chamber, a main valve having heads normally closing the port in the auxiliary valve and controlling communication between the ports of the main-valve chamber, a piston on the main-valve stem which projects through the port in the auxiliary valve, an auxiliary piston attached to the auxiliary valve and provided with a cylindrical extension in which the main piston is fitted, said pistons being arranged one within the other between the train-pipe and auxiliary-reservoir ports of the auxiliary-valve chamber, and a spring acting on the auxiliary piston in opposition to the auxiliary-reservoir pressure, substantially as and for the purposes set forth.

6. In a triple valve for air-brakes the combination of a valve-case having train-pipe, auxiliary-reservoir and brake-cylinder connections, an auxiliary-valve chamber having ports communicating with the train-pipe and auxiliary reservoir, a main-valve chamber opening at one end into said auxiliary-valve chamber and having ports communicating with the brake-cylinder and with the atmosphere, by-passages around or outside of the main-valve chamber having ports opening into the auxiliary-valve chamber, and communicating respectively with the train-pipe and brake-cylinder, a check-valve in the by-passage between the train-pipe and auxiliary-valve chamber, an auxiliary valve normally closing the ports of said by-passages, a main valve controlling communication between the ports of the main-valve chamber and the admission of air to said chamber from the auxiliary-valve chamber, pistons arranged in the auxiliary-valve chamber between the train-pipe and auxiliary-reservoir ports, and connected respectively with the main and auxiliary valves, and a spring acting upon the auxiliary-valve piston in opposition to the auxiliary-reservoir pressure, the main-valve piston being movable independently of the auxiliary-valve piston, substantially as and for the purposes set forth.

7. In a triple valve for air-brakes the combination of a valve-case having train-pipe, auxiliary-reservoir and brake-cylinder connections, an auxiliary-valve chamber having ports in communication with the train-pipe and auxiliary reservoir, a main-valve chamber opening at one end into said auxiliary-valve chamber and having ports communicating with the brake-cylinder and with the atmosphere, by-passages around or outside of the main-valve chamber communicating respectively with the train-pipe and brake-cylinder and having ports communicating through a restricted opening with the auxiliary reservoir, an auxiliary valve normally closing the ports of said by-passages, a main valve controlling communication between the ports of the main-valve chamber and the admission of air into said chamber from the auxiliary-valve chamber, and pistons connected with said valves respectively and movable in the auxiliary-valve chamber between its connections with the train-pipe and auxiliary reservoir, the main-valve piston being movable independently of the auxiliary-valve piston, substantially as and for the purposes set forth.

8. In a triple valve for air-brakes, the combination of a valve-case having train-pipe, auxiliary-reservoir and brake-cylinder connections, an auxiliary-valve chamber communicating with the train-pipe and auxiliary reservoir, a main-valve chamber opening at one end in communication with the auxiliary-valve chamber, and having ports communicating with the brake-cylinder and with the atmosphere, by-passages around or outside of the main-valve chamber having ports opening into the auxiliary-valve chamber and communicating respectively with the train-pipe and brake-cylinder, an auxiliary valve normally closing the ports of said by-passages, a main valve controlling communication through the main-valve chamber between the brake-cylinder and auxiliary reservoir, and between the brake-cylinder and the atmosphere, and pistons arranged in the auxiliary-valve chamber between the train-pipe and auxiliary-reservoir connections and connected respectively with the main and auxiliary valves, substantially as and for the purposes set forth.

In testimony that I claim the foregoing as my own I affix my signature in presence of two witnesses.

NIELS ANTON CHRISTENSEN.

Witnesses:
    CHAS. L. GOSS,
    ERNEST SHULT.